April 1, 1924.  
S. MIKE  
ANTIGLARE SHIELD  
Filed Dec. 10, 1923
1,489,139
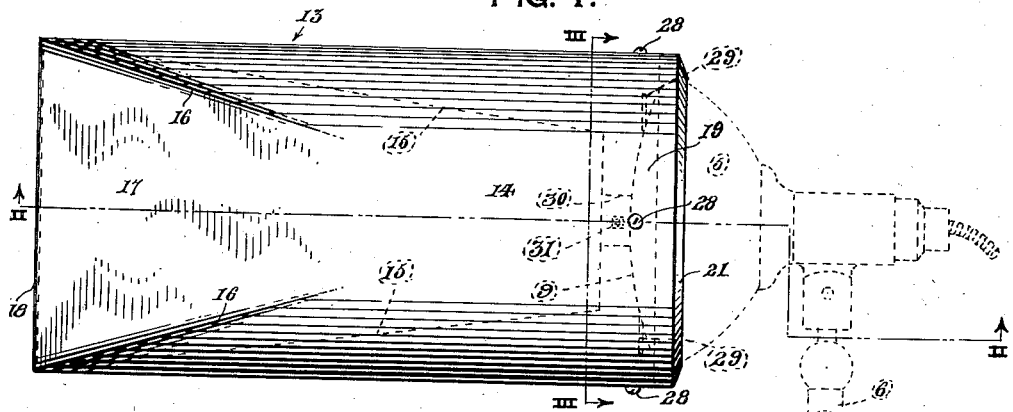
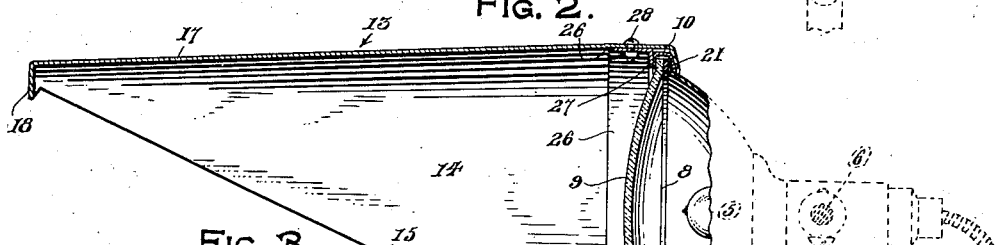
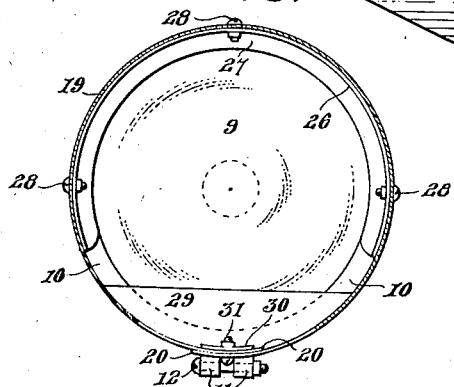
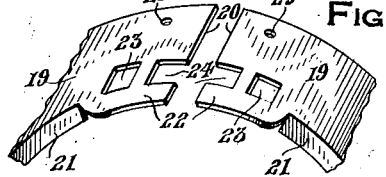
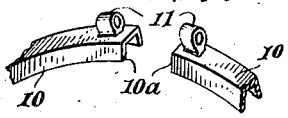
Inventor  
S. Mike
By F. H. Bryant  
Attorney 1,489,139

Patented Apr. 1, 1924.

UNITED STATES PATENT OFFICE.

STEVE MIKE, OF WELCH, WEST VIRGINIA, ASSIGNOR OF TWO-THIRDS TO ISADORE KATZEN, OF WELCH, WEST VIRGINIA.

ANTIGLARE SHIELD.

Application filed December 10, 1923. Serial No. 679,680.

*To all whom it may concern:*

Be it known that I, STEVE MIKE, a citizen of Hungary, residing at Welch, in the county of McDowell and State of West Virginia, have invented certain new and useful Improvements in Antiglare Shields, of which the following is a specification.

This invention relates to new and useful improvements in anti-glare shields for automobile headlights and spotlights.

An important object of the invention is to provide a shield which may be quickly and easily attached to substantially all standard forms of automobile spotlights and headlights.

A further object of the invention is to provide a shield that will deflect all rays of light which would naturally be directed upwardly by the lower portion of the reflector, embodied in the lamp to which this shield is attached, for eliminating all glaring light that might confuse approaching pedestrians and vehicle drivers.

A further object of the invention is to provide a shield for automobile lights which is of exceedingly simple construction, efficient in its operation, and one that may be manufactured at a very nominal cost.

Other objects and advantages of the invention will be apparent during the course of the following description.

In the accompanying drawing forming a part of this specification and in which like numerals are employed to designate like parts throughout the same, Figure 1 is a top plan view of the antiglare shield, embodying this invention properly attached to an automobile spotlight, shown in dotted lines, Figure 2 is a longitudinal sectional view taken upon lines II—II of Fig. 1, Figure 3 is a transverse sectional view taken upon line III—III of Fig. 1, Figure 4 is a detail perspective view of an arcuate removable clamping strip which forms a part of this invention, Figure 5 is a detail perspective view of an auxiliary shield plate, shown in Figs. 2 and 3, Figure 6 is a fragmentary perspective view of a clamping band which forms a part of the body portion of the shield, and Figure 7 is a fragmentary perspective view of a lens clamping ring which forms part of the invention.

In the drawing, wherein for the purpose of illustration is shown a preferred embodiment of this invention, the numeral 5 designates the spotlight, shown in dotted lines in Figs. 1 and 2. In this showing of the invention, the spotlight 5 is provided with a bracket support 6 which permits the spotlight to be adjusted in respect to the portion of the automobile to which it is attached. It is to be understood that the anti-glare shield embodying this invention is suitable for being attached to all circular lights, such as spotlights and headlights for automobiles. In Fig. 2, it will be seen that the casing which forms a part of the spotlight, is provided with an outwardly flaring annular flange 7 against the outer face of which is intended to be positioned a fibrous washer 8 which is adapted for receiving the glass lens 9 thereagainst, as illustrated.

Encircling the peripheral edges of the flange 7, fibrous washer 8, and lens 9 is a channel clamping ring 10 which is split transversely to provide the ends 10ª, shown best in Fig. 7, for permitting the said clamping ring to be tightened or loosened upon the said light. Positioned in proximity to these ends 10ª are the substantially tubular shaped bosses 11 which are provided for receiving the clamping bolt 12, shown in Figs. 2 and 3.

The shield proper, as designated in its entirety by the numeral 13, is intended to be stamped from a sheet of flexible material, such as metal, fiber, etc., and bent into substantially cylindrical formation for a portion of its length, as designated by the numeral 14 and is provided with upwardly inclined edges 15, as best illustrated in Fig. 2. A portion of the top of the shield 13 is bent on the outwardly diverging lines 16 for forming the flat top wall portion 17 which is provided with a depending transverse outer wall section 18, as best illustrated in Fig. 2. It will be seen that this shield 13 is of substantially a shape simulating an inverted scoop. The inner transverse edge of this scoop-shaped shield 13 is formed with a clamping band 19 which is transversely split to provide the adjacent edges 20, as best illustrated in Fig. 6. The annular edge of this clamping band 19 is provided, for substantially its entire length, with an inwardly directed flange 21 which is intended to flatly engage the inner wall of the channel clamping ring 10, when the said shield is placed upon the light 5. By inspecting Fig. 6, it will be seen that the ends of the clamping band, as designated by the numeral 20, are provided with the wings 22, instead of the annular flange 21. Adjacent to these wings 22, each end 20 is provided with a square aperture 23 and a cutout portion 24. The said ends 20 are also provided with relatively small circular openings 25.

In mounting the inverted scoop-shaped shield 13 upon the light 5, the channel clamping ring 10 is first positioned upon the latter and the scoop-shaped shield is then placed around the clamping ring with the bosses 11, of the ring 10, inserted through the square apertures 23 and cutout portions 24. It is to be understood that the cutout portion 24 of one of the ends of the clamping band 9 is to be positioned in alinement with the square aperture of the other end 20 of the clamping band and the cutout portion 24 of this last mentioned end 20 is to be positioned in alinement with the square aperture 23 formed in the first mentioned end 20. It will be seen by this arrangement, that when the clamping bolt and nut 12 are operated to tighten the channel clamping ring upon the periphery of the light 5 and lens 9, that the clamping band 19 of the inverted scoop-shaped shield 13 also will be tightened about the channel clamping ring.

It will be seen by this construction that only one side of the clamping band 19 will be properly connected to the lamp 5, therefore, an arcuate removable clamping strip 26 is provided for being positioned against the inner face of the inverted scoop-shaped shield 13 in properly spaced relation to the annular inwardly directed flange 21 carried by the clamping band 19 and is also provided with an inwardly directed flange 27 which is intended to be placed in engagement with the outer face of the channel clamping ring 10 and to be retained in this position by means of the bolts and nuts 28 which are passed through suitable openings formed in the arcuate removable clamping strip 26 and clamping band 19. It will be seen, from this construction, that the entire inverted scoop-shaped shield 13 will be securely fastened to the lamp 5. In Figs. 2, 3 and 5, there is shown what I will term an auxiliary shield plate 29 which is provided with a laterally extending apertured lug 30 which is intended to be secured to the clamping band 19 by means of a bolt and nut 31 which passes through the aperture in the lug 30 and through the relatively small apertures 25 formed in the adjacent ends 20 of the clamping band 19. While I have described these relatively small openings 25 in the ends 20 of the clamping band 19 as being circular in formation, it is to be understood that one of these openings 25 may be of elongated formation for better enabling the said clamping band to be tightened about the lamp 5. Such a formation will permit the inverted scoop-shaped shield to be adapted for being positioned upon different sized lights. In the particular form illustrated, the clamping band 19 is intended to be of a proper size to position the openings 25 in alinement when the said band is properly tightened upon the lamp 5. It will be seen, by inspecting Figs. 2 and 3, that the auxiliary shield plate 29 is to be positioned for shielding a portion of the lower part of the lens 9.

The operation of the shield, embodying this invention, to eliminate glaring rays of light from being thrown upwardly into the eyes of an approaching pedestrian or vehicle driver is as follows. It is to be understood, that the spotlight 5, or headlight in case the shield is to be employed in connection with such a light, may be tilted downwardly at any angle desired for throwing the light any distance outwardly from the front of the vehicle that the operator of the latter may desire. All rays of light that will naturally be thrown from the electric bulb, positioned within the lamp 5, against the upper portion of the reflecting surface of the said light will be allowed to be reflected downwardly onto the road in front of the vehicle without being obstructed in any way. The rays of light, however, that are naturally reflected upwardly by the lower portion of the reflecting surface of the lamp 5, will be deflected downwardly by the inner surface of the inverted scoop-shaped shield 13 and will, therefore, be substantially concentrated with the previously mentioned rays of light. The auxiliary shield plate 29 is provided for stopping or deflecting inwardly all rays of light that might be thrown upwardly by the reflecting portion of the lamp 5 positioned directly inwardly of the said auxiliary shield plate 29.

It is believed that the manner of mounting the various elements forming the anti-glare shield embodying this invention upon the light 5 will be understood from the detail description of the same, therefore, further explanation of the same is deemed unnecessary.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:—

1. In a shield of the type described, the combination with a vehicle light casing having a flanged outer end and a lens adapted to be retained against said flange, of an inverted scoop-shaped shield having a clamping band at its inner end, a clamping ring for securing said lens to the casing flange, means for connecting said clamping band and clamping ring for mounting said scoop-shaped shield upon said lamp casing, an auxiliary shield plate, and means for connecting said shield plate to said clamping band for positioning the plate outwardly of the said lens.

2. In a shield of the type described, the combination with a vehicle light casing having a flanged outer end and a lens adapted to be retained against said flange, of an inverted scoop-shaped shield having a clamping band at its inner end and a depending transversely extending outer wall formed with its outer end, a clamping ring for securing said lens to said casing flange, means for securing one side of said clamping band to said clamping ring, and a clamping strip adapted to be secured to the inverted scoop-shaped shield adjacent its inner end for connecting the opposite side of the same to the clamping ring.

3. In a shield of the type described, the combination with a vehicle light casing having a flanged outer end and a lens adapted to be retained against said flange, of an inverted scoop-shaped shield having a clamping band at its inner end and a flat top wall section at its outer end which is provided with a depending transversely extending end wall, a channel-shaped clamping ring for securing said lens to said casing flange, means for connecting said clamping band to said channel-shaped clamping ring, an auxiliary shield plate, and means for securing said auxiliary shield plate to said clamping band for positioning the said plate outwardly of the lens.

In testimony whereof I affix my signature.

STEVE MIKE.